(12) United States Patent
Hamblin et al.

(10) Patent No.: US 8,031,174 B2
(45) Date of Patent: Oct. 4, 2011

(54) MULTI-TOUCH SURFACE STACKUP ARRANGEMENT

(75) Inventors: Mark Arthur Hamblin, San Francisco, CA (US); Richard Hung Minh Dinh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1283 days.

(21) Appl. No.: 11/650,003

(22) Filed: Jan. 3, 2007

(65) Prior Publication Data
US 2008/0158173 A1 Jul. 3, 2008

(51) Int. Cl.
G09G 5/08 (2006.01)
(52) U.S. Cl. ........ 345/158; 345/169; 345/173; 361/300; 361/616; 361/679.3
(58) Field of Classification Search .......... 345/173–178, 345/204, 156, 158, 207, 901, 905; 361/681–683, 361/600, 616, 625, 679.01, 679.02, 679.03, 361/679.09, 679.26, 679.3
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A * | 3/1999 | Gillespie et al. | 178/18.01 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,624,944 B1 | 9/2003 | Wallace et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,289,099 B2 * | 10/2007 | Chang et al. | 438/30 |
| 7,663,607 B2 | 2/2010 | Hotelling et al. | |
| 2003/0189557 A1 * | 10/2003 | Takagi et al. | 345/204 |
| 2005/0168966 A1 * | 8/2005 | Maeda et al. | 362/23 |
| 2006/0026521 A1 | 2/2006 | Hotelling et al. | |
| 2006/0097991 A1 | 5/2006 | Hotelling et al. | |

(Continued)

FOREIGN PATENT DOCUMENTS

JP 2000-163031 A 6/2000

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Quan-Zhen Wang
*Assistant Examiner* — Jennifer Nguyen
(74) *Attorney, Agent, or Firm* — Morrison & Foerster LLP (57) ABSTRACT

A multi-layer cover for an electronic device having one or more of a sensor panel, a proximity sensor, an ambient light sensor, and a display device can include an outer hardcoat, a structural layer, an IR transmissive ink layer, a mask layer, and a backside hardcoat. The backside hardcoat can reduce cover warpage, enable full surface lamination of the cover to the sensor panel, prevent bubbles from forming in transparent windows in the cover, enable a wider range of functional inks to be applied in various layering orders to allow certain types of light to pass through while blocking others, and hide the sensors to provide a seamless, uncluttered visual appearance.

37 Claims, 3 Drawing Sheets

U.S. PATENT DOCUMENTS

2006/0197753 A1 9/2006 Hotelling
2008/0158172 A1 7/2008 Hotelling et al.
2009/0021488 A1* 1/2009 Kali et al. .................. 345/173

FOREIGN PATENT DOCUMENTS

JP 2002-342033 A 11/2002

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MULTI-TOUCH SURFACE STACKUP ARRANGEMENT

FIELD OF THE INVENTION

This relates to covers for electronic devices, and more particularly, to a cover that is able to provide light-transmissive apertures required for various sensors and display devices in an electronic device, while hiding them from the user to provide a seamless, uncluttered visual appearance.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Proximity sensors are another type of input device capable of detecting hover events (the no-touch, close proximity hovering of fingers or other objects above a surface but outside the near-field detection capabilities of touch sensors) as well as touch events. Proximity sensors can be employed singly or in a few important locations in a computing system, or can be arranged in panels. Proximity sensor panels may be able to detect multiple instances of hovering referred to herein as multi-hover events (the hovering of fingers or other objects above a surface at distinct locations at about the same time). Examples of a proximity sensor, a proximity sensor panel, a multi-hover panel and a computing system using both a multi-touch panel and proximity sensors are described in Applicant's co-pending U.S. application Ser. No. 11/649,998 entitled "Proximity and Multi-Touch Sensor Detection and Demodulation," published as U.S. Patent Application Publication No. 2008/0158172, filed on Jan. 3, 2007, the contents of which are incorporated by reference herein.

Ambient light sensors are yet another type of input device capable of detecting various levels of ambient light. Ambient light sensors can be employed singly or in a few strategic locations in a housing of a computing system.

Proximity sensors, proximity sensor panels, and ambient light sensors can be employed either alone or in combination with multi-touch sensor panels as input devices for computing systems. In addition, as mentioned above, a display screen can be located beneath the sensor panel. A user interface (UI) algorithm can generate a virtual keypad or other virtual input interface beneath the sensor panel that can include virtual buttons, pull-down menus and the like. By detecting touch or hover events at locations defined by the virtual buttons, the UI algorithm can determine that a virtual button has been "pushed." The magnitude of the analog channel output values, indicating the "degree" of touch or hover, can be used by the UI algorithm to determine whether there was a sufficient amount of touch or hover to trigger the pushing of the virtual button.

Because the proximity sensors, proximity sensor panels, ambient light sensors, and display screens all require some access to the outside world to detect fingers or objects, or pass IR light or visible light, any housing incorporating one or more of these devices must provide apertures for such access. Often, openings are formed in an outer cover of the housing to provide this access. However, because these openings represent discontinuities in the otherwise uniform surface of the cover, assembly difficulties can arise. Furthermore, these openings and discontinuities can cause the outer surface to look "busy" or overly complicated, and detract from the aesthetic appearance of the computing device.

SUMMARY OF THE INVENTION

A multi-layer cover for an electronic device having one or more of a sensor panel, a proximity sensor, an ambient light sensor, and a display device can include an outer hardcoat, a structural layer, an IR transmissive ink layer, a mask layer, and a backside hardcoat. The backside hardcoat can reduce cover warpage, enable full surface lamination of the cover to the sensor panel, prevent bubbles from forming in transparent windows in the cover, enable a wider range of functional inks to be applied in various layering orders to allow certain types of light to pass through while blocking others, and hide the sensors to provide a seamless, uncluttered visual appearance.

Electronic devices can include a sensor panel, a display device, ambient light sensors, discrete proximity sensors, and other openings. To accommodate the sensor panel and display device, a transparent aperture can be formed on the cover of the electronic device. In addition, to allow light to be detected by the ambient light sensor, an ambient light aperture can be substantially aligned with the ambient light sensor. Furthermore, to allow IR light to be transmitted from and received by the proximity sensor, an IR aperture can be substantially aligned with the proximity sensor. All other areas on the cover can present a uniform appearance, such as a black finish, to the user. In addition, it can be desirable to extend this uniform appearance over the ambient light aperture and the IR aperture to hide these apertures and give a simple, uncluttered appearance to the device.

The cover can include, from outside to inside, an outer hardcoat, which can be substantially transparent and be capable of preventing moisture absorption, followed by a structural layer, which can also be substantially transparent and formed from a plastic such as polymethyl methacrylate (PMMA). The next layer of the cover can be an IR transmissive ink, which can pass IR light and some amount of visible (ambient) light, and can also provide a uniform color (e.g. black) representing the primary color of the cover. The next layer of the cover can be a mask layer, which can be generally opaque and capable of blocking both IR and visible light. The mask layer can be the same color as the IR transmissive ink to further maintain the uniform appearance of the cover. The next layer of the cover can be a backside hardcoat, which can be a different type of hardcoat from the outer hardcoat. The backside hardcoat can be substantially transparent, can have a thermal coefficient of expansion similar or identical to that of the outer hardcoat, and can act as a moisture barrier for the cover.

The backside hardcoat can provide several advantages for the cover. The backside hardcoat, along with the outer hardcoat, can minimize warping of the cover if both hardcoats have similar thermal coefficient of expansions and act as a moisture barrier.

The backside hardcoat also enables full surface lamination of the sensor panel to the cover. Because the backside hardcoat provides a moisture barrier between the structural layer and adhesive used to bond the cover to the sensor panel, the backside hardcoat prevents outgassing from the structural layer into the adhesive. Because the problems associated with outgassing are avoided, the adhesive can be applied to the entire area of the backside hardcoat covered by the sensor panel, allowing full surface lamination. Full surface lamination can be advantageous because fewer discontinuities are formed between the cover and the sensor panel due to the fact that the transmissive properties of the adhesive are closer to those of glass and plastic as compared to air. The reduction in discontinuities results in higher transmissivity, less reflections (less optical loss), and higher brightness from the display device.

The backside hardcoat also provides another advantage in acting as a conformal coat to prevent bubbles from appearing in transparent aperture. By applying the backside hardcoat as a smoothing conformal coat, the transition or step at the perimeter of the transparent aperture is reduced and smoothed over, which reduces or eliminates the bubbling that can occur when sheet adhesive is applied.

The ambient light aperture is formed to allow ambient (visible) light to pass through the cover and impinge upon the ambient light sensor. The IR aperture is formed to allow IR light to be transmitted from and received by the proximity sensor. Selective use of ink layers can be critical to the operation of these apertures and sensors. The IR transmissive ink can be used to pass maximum IR light (e.g. about 95% of the total IR light) and minimum visible light (e.g. about 5-10% of the total visible light), while the mask layer can be used to block any visible light that gets through the IR transmissive ink. For areas with no apertures, the mask layer blocks both visible and IR light. For the IR aperture, the mask layer is absent, and the IR transmissive ink is used to pass the IR light. For the ambient light aperture, the mask layer is absent, and the IR transmissive ink, although capable of passing only about 5-10% of visible light, is used to pass enough visible light to be sensed by the ambient light sensor.

With the IR transmissive ink applied directly to the structural layer, and the mask layer applied to the IR transmissive ink, a single, unbroken, uniform layer of IR transmissive ink is present at the user side of the cover. As a result, the apertures in the mask layer cannot be seen, and a uniform appearance is presented.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of embodiments of this invention.

A multi-layer cover for an electronic device having one or more of a sensor panel, a proximity sensor, an ambient light sensor, and a display device can include an outer hardcoat, a structural layer, an IR transmissive ink layer, a mask layer, and a backside hardcoat. The backside hardcoat can reduce cover warpage, enable full surface lamination of the cover to the sensor panel, prevent bubbles from forming in windows in the cover, enable a wider range of functional inks to be applied in various layering orders to allow certain types of light to pass through while blocking others, and hide the sensors to provide a seamless, uncluttered visual appearance.

Although some embodiments of this invention may be described herein in terms of display devices and touch, proximity and ambient light sensors and panels incorporated into an electronic device, it should be understood that embodiments of this invention are not so limited, but are generally applicable to any type of device that requires apertures or openings in a cover for a housing so that light can pass through or so that fingers or other objects can be detected.

Figure 1:
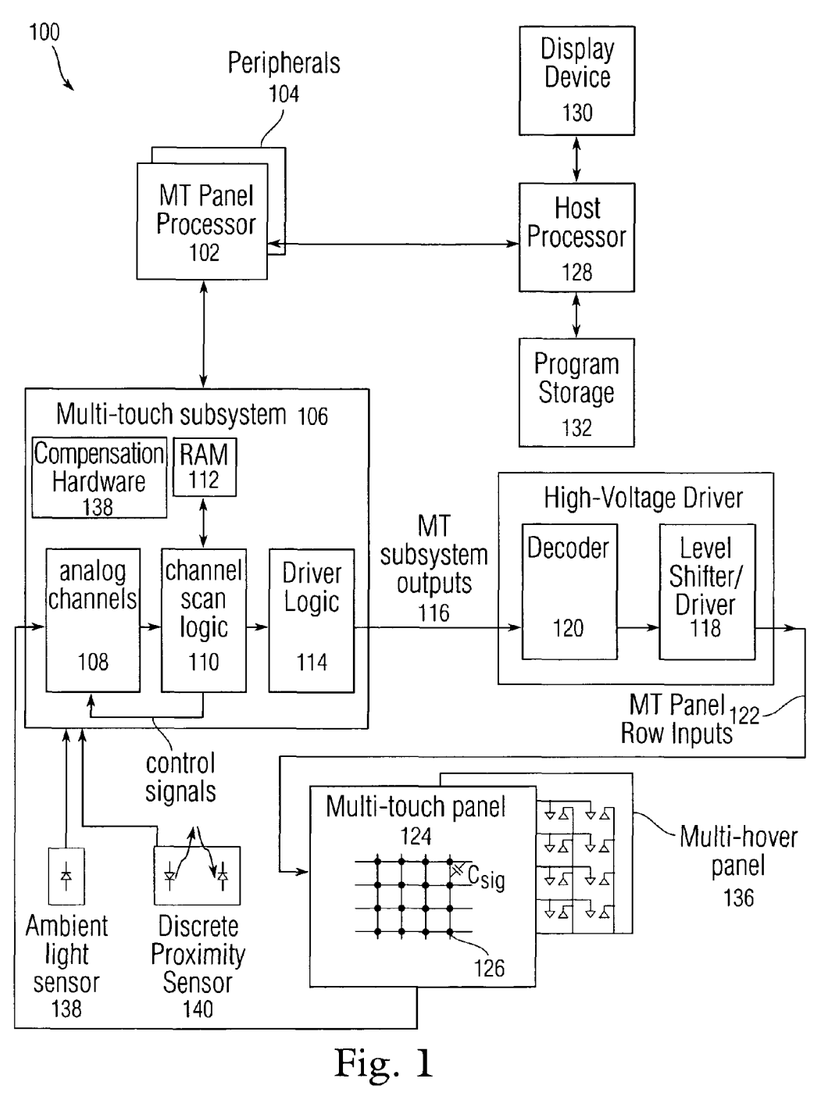
FIG. 1 illustrates an exemplary computing system operable with one or more of a multi-touch panel, a multi-hover panel, one or more ambient light sensors, and one or more discrete proximity sensors according to one embodiment of this invention.

FIG. 1 illustrates exemplary computing system 100 operable with one or more of multi-touch panel 124, multi-hover panel 136, one or more ambient light sensors 138, and one or more discrete proximity sensors 140. Computing system 100 can include one or more panel processors 102 and peripherals 104, and panel subsystem 106. One or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 or multi-hover panel 136 to analog channels 108. In addition, channel scan logic 110 can control the driver logic and stimulation signals being selectively applied to rows of multi-touch panel 124 or multi-hover panel 136. Compensation hardware 138 in panel subsystem 106, UI algorithm 140 in software or firmware executed by panel processor 102 and/or channel scan logic 110 (which may be referred to collectively herein as simply UI logic) can be used to perform the sensor panel compensation according to embodiments of the invention. In some embodiments, panel subsystem 106, panel processor 102 and peripherals 104 can be integrated into a single application specific integrated circuit (ASIC).

Driver logic 114 can provide multiple panel subsystem outputs 116 and can present a proprietary interface that drives high voltage driver 118. High voltage driver 118 can provide level shifting from a low voltage level (e.g. complementary metal oxide semiconductor (CMOS) levels) to a higher voltage level, providing a better signal-to-noise (S/N) ratio for noise reduction purposes. The high voltage driver outputs can be sent to decoder 120, which can selectively connect one or more high voltage driver outputs to one or more panel row inputs 122 through a proprietary interface and enable the use of fewer high voltage driver circuits in high voltage driver 118. Each panel row input 122 can drive one or more rows in multi-touch panel 124 or multi-hover panel 136. In some embodiments, high voltage driver 118 and decoder 120 can be integrated into a single ASIC. However, in other embodiments high voltage driver 118 and decoder 120 can be integrated into driver logic 114, and in still other embodiments high voltage driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

Figure 2:
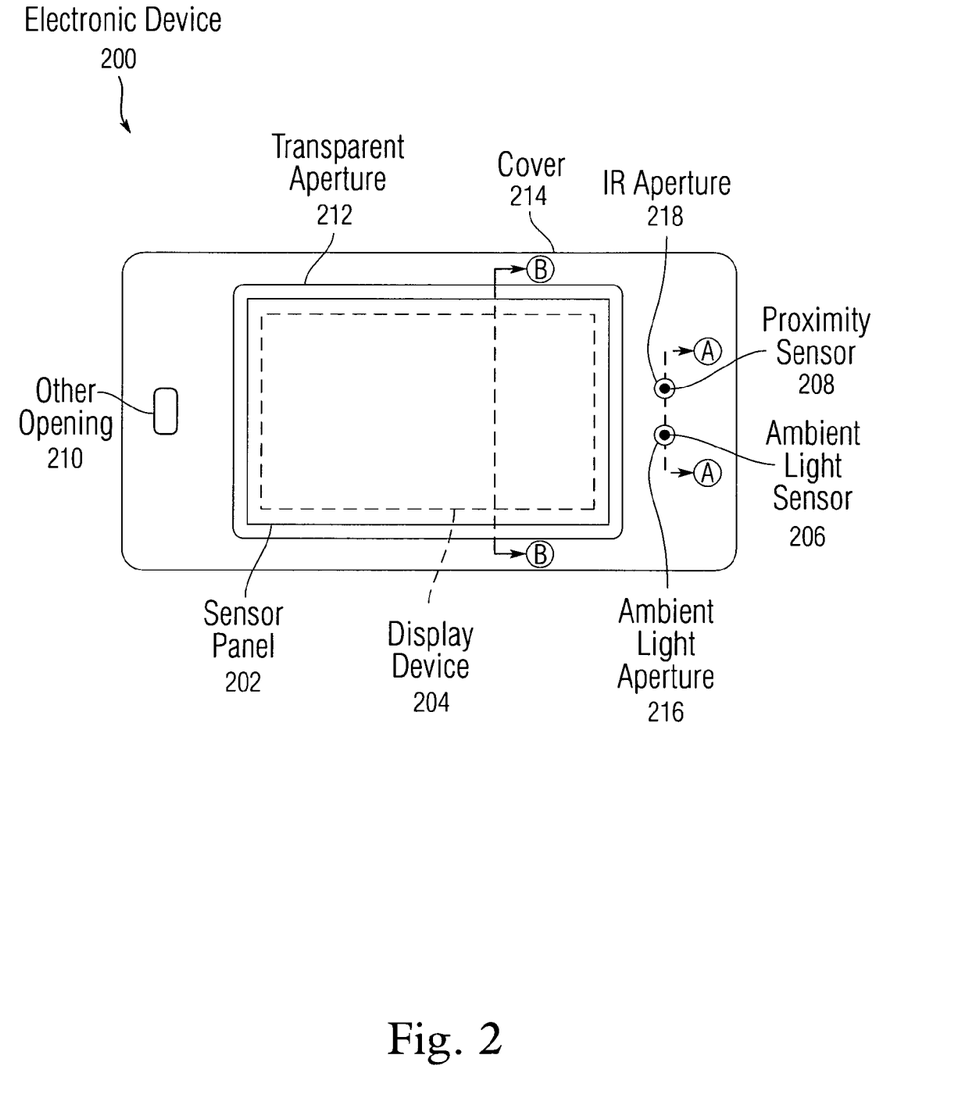
FIG. 2 illustrates a top view of an exemplary electronic device incorporating the computing system of FIG. 1 according to one embodiment of this invention.

FIG. 2 illustrates a top view of exemplary electronic device 200 incorporating the computing system of FIG. 1. Electronic device 200 can be incorporated in a number of different systems, including, but not limited to, desktops, laptops, tablets or handhelds, including personal digital assistants (PDAs), digital audio and/or video players and mobile telephones, public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Electronic device 200 can include one or more sensor panels 202, display device 204, one or more ambient light sensors 206, one or more discrete proximity sensors 208, and other openings 210. It should be understood that these devices and sensors and their locations are representative only. To accommodate sensor panel 202 and display device 204, transparent aperture 212 can be formed on cover 214 of the electronic device. In addition, to allow light to be detected by ambient light sensor 206, ambient light aperture 216 can be substantially aligned with the ambient light sensor. Furthermore, to allow IR light to be transmitted from and received by proximity sensor 208, IR aperture 218 can be substantially aligned with the proximity sensor. All other areas on cover 214 can present a uniform appearance, such as a black finish, to the user. In addition, in some embodiments of the invention, it can be desirable to extend this uniform appearance over ambient light aperture 216 and IR aperture 218 to hide these apertures and give a simple, uncluttered appearance to device 200. Therefore, it should be understood that use of the term "aperture" above is not intended to represent physical holes formed in cover 214—the cover can be entirely smooth—but rather areas in the cover that are light-transmissive.

Figure 3:
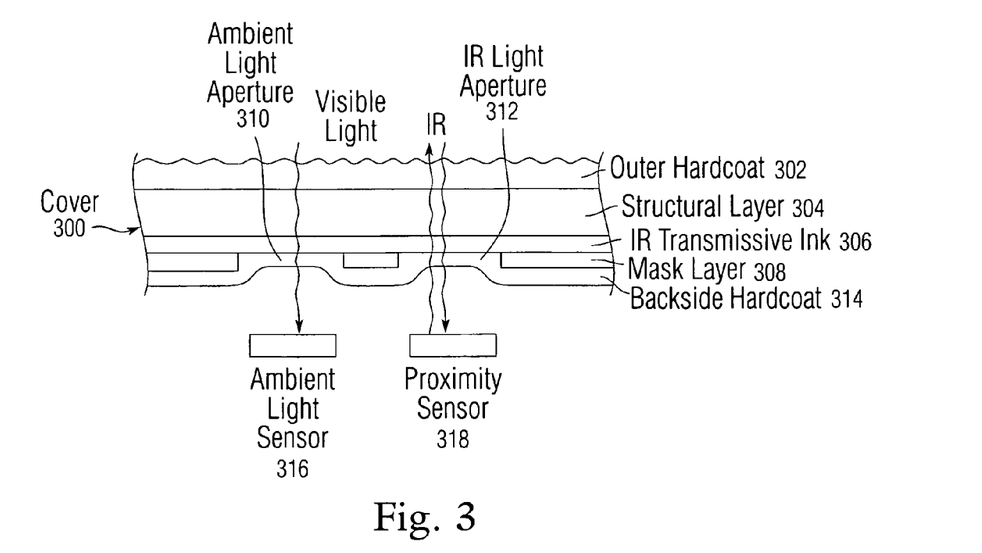
FIG. 3 illustrates a cross-section of the cover that covers the top of the exemplary electronic device of FIG. 2 along the view (A)-(A) according to one embodiment of this invention.

FIG. 3 illustrates a cross-section of cover 300 that covers the top of the exemplary electronic device of FIG. 2, along the view (A)-(A) shown in FIG. 2. Note that the view (A)-(A) cuts through the ambient light aperture and the IR aperture of FIG. 2. Referring to FIG. 3, and proceeding in order from outside to inside, cover 300 can include outer hardcoat 302, which can be substantially transparent and can prevent moisture absorption. Hardcoat 302 can be an acrylate-based UV-cured hardcoat applied by dip coating, such as MSK AD MR manufactured by Meihan Shinku Kogyo. Hardcoat 302 can also be a polyurethane or silicone-based coating, or other hardcoats with a thickness between about 1 and 50 um. Outer hardcoat 302 can be chosen to prevent scratching, and can have a slightly roughened surface to reduce glare and provide a pleasant feel for the user. The next layer of cover 300 can be structural layer 304, which can also be substantially transparent and formed from a plastic such as polymethyl methacrylate (PMMA), polycarbonate (PC), and the like, although other materials can be used, such as glass, PET, PCTA, PCTG, PMP, PS, FEP, CA Butyrate, PVC, PPO/PS, ASA, Acryonitrile, PMMA/P, SAN, cyclic olefin co-polymer (COC), and sapphire crystal, all of which are known to those skilled in the art. Outer hardcoat 302 can be applied and affixed to the outside-facing surface of structural layer 304 using any number of known methods, including rolling, dipping, spraying, extrusion coating and the like. The next layer of cover 300 can be IR transmissive ink 306, which can pass IR light and some amount of visible (ambient) light, and can also provide a uniform color (e.g. black) representing the primary color of the cover. IR transmissive ink 306 can include Teikoku 13-IR, or other IR inks with at least about 2% visible light transmission and a dry film thickness of between about 1 um and 15 um. IR transmissive ink 306 can be applied and affixed to the inside-facing surface of structural layer 304 using any number of known methods, including rolling, spraying and the like. The next layer of cover 300 can be mask layer 308, which can be generally opaque and capable of blocking both IR and visible light. Mask layer 308 can include Teikoku MRX series ink, Marabu Marastar, and Teikoku 13 series inks. Mask layer 308 can be applied and affixed to structural layer 304 using any number of known methods, including rolling, screen printing, spraying and the like. Mask layer 308 can be the same color as IR transmissive ink 306 (e.g. black ink, also referred to as "blackmask"), to further maintain the uniform appearance of cover 300. Note that two openings or apertures are formed in mask layer 308 in the example of FIG. 3, representing ambient light aperture 310 and IR aperture 312. The next layer of cover 300 can be backside hardcoat 314, which can be a different type of hardcoat from outer hardcoat 302. Backside hardcoat 314 can include acrylate-based UV-cured hardcoats such as LihoChem LHUV-32G-20B, polyurethane or silicone based coatings, or other coatings with a thickness of between about 10 um to 100 um. Backside hardcoat 314 can be applied and affixed to mask layer 308 using any number of known methods, including rolling, dipping, spraying, extrusion coating and the like. Backside hardcoat 314 can be substantially transparent, can have a thermal coefficient of expansion similar or identical to that of outer hardcoat 302, and can act as a moisture barrier for cover 300.

Backside hardcoat 314 can provide several advantages for cover 300. Backside hardcoat 314, along with outer hardcoat 302, can minimize warping of cover 300 if both hardcoats have similar thermal coefficients of expansion and act as a moisture barrier.

Figure 4:
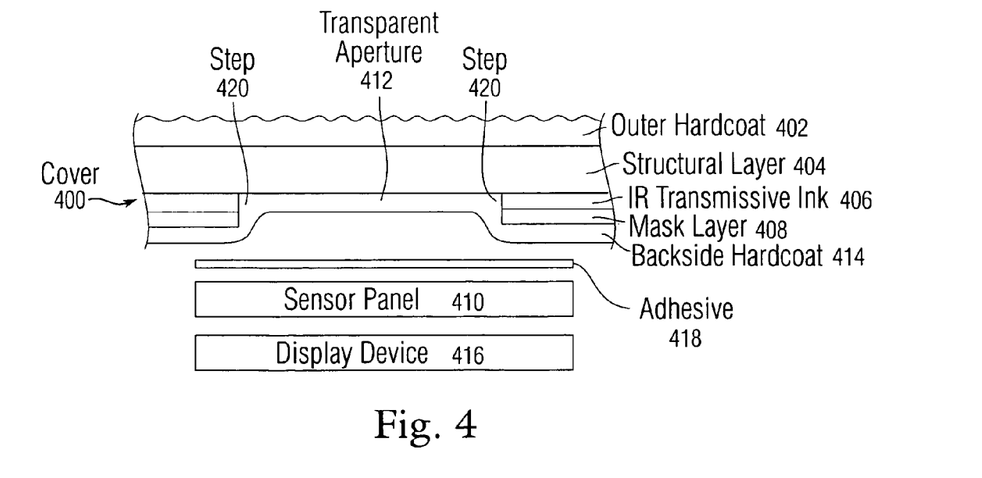
FIG. 4 illustrates a cross-section of exemplary cover 400 that covers the top of the exemplary electronic device of FIG. 2 along the view (B)-(B) according to one embodiment of this invention.

The backside hardcoat also enables full surface lamination of the sensor panel to the cover. FIG. 4 illustrates a cross-section of exemplary cover 400 that covers the top of the exemplary electronic device of FIG. 2, along the view (B)-(B) shown in FIG. 2. Note that the view (B)-(B) cuts through the transparent aperture of FIG. 2, where maximum passage of visible light is desired. FIG. 4 shows, proceeding in order from outside to inside, outer hardcoat 402, structural layer 404, IR transmissive layer 406, mask layer 408, and backside hardcoat 414. In addition, sensor panel 410 and display device 416 can be located underneath transparent aperture 412.

In a conventional assembly process, sensor panel 410 and display device 416 are bonded to each other and to cover 400 using adhesive only at their edges. The adhesive can be an acrylic-based adhesive. Bonding these components only at the edges can cause several problems. First, edge bonding or lamination can lead to a springy feel when the center of transparent aperture 412 is touched, which can create an impression of device flimsiness in the mind of the user. Edge bonding can also cause a pooling or rippling appearance in transparent aperture 412 when the center of the transparent aperture is touched, which can distort the display. Applying adhesive only at the edges also causes air gaps to form between layers. Because the transmissive properties of air can be quite different from those of cover 400 and sensor panel 410 (which can be formed from plastic and glass, respectively), as light passes through these discontinuities, light transmissivity decreases and light reflections increase, both of which are undesirable.

Nevertheless, edge lamination is conventionally the preferred technique, because the adhesives used in the bonding process tend to outgas and causes bubbles and de-lamination. The bubbles are caused by outgassing from the structural layer, in particular when the structural layer is formed of material such as PMMA. Chemicals in the PMMA or moisture drawn into the PMMA can both outgas over time into the adhesive, especially with elevated temperatures, causing de-lamination and a degraded cosmetic appearance.

However, because backside hardcoat 414 provides a moisture barrier between structural layer 404 and a full layer of adhesive 418, the backside hardcoat prevents outgassing from structural layer 404 to the adhesive. Because the problems associated with outgassing are avoided, adhesive 418 can be applied to the entire area of backside hardcoat 410 covered by sensor panel 410, allowing full surface lamination. Adhesive 418 can include 3M Optical Adhesive such as 3M Optically Clear Adhesive (OCA), types 8187, 8141, 8142, 9483, 8185, 8147, or other adhesives from Nitto Denko and Adhesives Research. 8187 is an acrylic-based adhesive, and more specifically a "transfer tape" which implies there is no backing film in the adhesive and the entire cross-section of the tape is actual adhesive. "Double-sided tapes," which implies there is a backing film, could also be used, or multi-layer adhesives which implies there are two layers of somewhat different adhesives without a backing film between them. Full surface lamination can be advantageous because fewer discontinuities are formed between cover 400 and sensor panel 410 due to the fact that the transmissive properties of adhesive 418 (which can have a refractive index of about 1.47 in some embodiments) are closer to those of glass and plastic (with refractive indices of about 1.5) as compared to air (refractive index of about 1.0). The reduction in discontinuities results in higher transmissivity, less reflections (less optical loss), and higher brightness from display device 416.

Backside hardcoat 414 also provides another advantage in acting as a conformal coat to prevent bubbles from appearing in transparent aperture 412. As shown in FIG. 4, without backside hardcoat 414, steps 420 would be present at the border between transparent aperture 412 on the one hand, and the areas of structural layer 404 coated with IR transmissive ink 406 and mask layer 408 on the other. In some instances, steps 420 can represent a difference of about 16 microns. If 8 micron sheet adhesive 418 is applied between sensor panel 410 and cover 400, the adhesive may not flow into the gaps created by steps 420, and as a result bubbles can appear at the inside perimeter of transparent aperture 412. However, by applying backside hardcoat 414, which can be sprayed on to serve as a smoothing conformal coat, steps 420 are reduced and smoothed over (made less severe), which reduces or eliminates the bubbling when sheet adhesive 418 is applied.

Referring again to FIG. 3, backside hardcoat 314 provides another advantage related to the use of functional inks. It is known in the art that it is difficult to print ink on hardcoats. Therefore, applying backside hardcoat 314 directly to structural layer 304 would have made the application of subsequent ink layers difficult. By applying backside hardcoat 314 after the application of IR transmissive ink 306 and mask layer 308, the ink layers can be applied directly to the structural layer 304, and more flexibility can be provided in the selection and ordering of the ink layers. In other words, more ink choices and layering orders are available to hide apertures in cover 300, and yet enable the apertures to pass the desired light spectrum.

Ambient light aperture 310 is formed to allow ambient (visible) light to pass through cover 300 and impinge upon ambient light sensor 316. IR aperture 312 is formed to allow IR light to be transmitted from and received by proximity sensor 318. Selective use of ink layers can be critical to the operation of these apertures and sensors. IR transmissive ink 306 can be used to pass maximum IR light (e.g. about 95% of the total IR light) and minimum visible light (e.g. about 5-10% of the total visible light), while the mask layer 308 can be used to block any visible light that gets through IR transmissive ink 306. Note that IR transmissive ink 306 can be used in various dilutions and applied uniformly across the entire surface of cover 300 to hide an aperture. For areas with no apertures, mask layer 308 blocks both visible and IR light. For IR aperture 312, mask layer 308 is absent, and IR transmissive ink 306 is used to pass IR light. For ambient light aperture 310, mask layer 308 is absent, and IR transmissive ink 306, although capable of passing only about 5-10% of visible light, is used to pass enough visible light to be sensed by ambient light sensor 316.

In conventional cover fabrication processes, the mask layer is applied directly to the structural layer, with apertures formed in the mask layer as needed to pass IR or visible light, and then IR transmissive ink is applied to the mask layer. However, without a single, unbroken, uniform layer of IR transmissive ink present at the user side of the cover, the apertures can be visible because the differences between the indices of refraction for the IR transmissive ink and the mask layer causes different amounts of light to be reflected, and because of slight color differences between the IR transmissive ink and the mask layer. Embodiments of the invention reverse this order, with IR transmissive ink 306 applied directly to structural layer 304, and mask layer 308 applied to IR transmissive ink 306. With a single, unbroken, uniform layer of IR transmissive ink 306 present at the user side of cover 300, the apertures in mask layer 308 cannot be seen, and a uniform appearance is presented.

As mentioned above and with reference to FIG. 2, electronic device 200 such as a mobile telephone or an audio/video player can use the computing system of FIG. 1, which can employ display devices and input devices such as touch sensor panels, proximity sensors and ambient light sensors. Such electronic devices and computing systems can advantageously use covers incorporating embodiments of this invention to reduce or eliminate cover warpage, enable full surface lamination of the cover to the sensor panel, prevent bubbles from forming in windows in the cover, enable a wider range of functional inks to be applied in various layering orders to allow certain types of light to pass through while blocking others, and hide the sensors to provide a seamless, uncluttered visual appearance.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A cover having one or more light-transmissive apertures for one or more devices below the cover, comprising:
   a substantially transparent structural layer;
   a substantially transparent outside hardcoat affixed to an outside-facing surface of the structural layer;
   infrared (IR) transmissive ink affixed to an inside-facing surface of the structural layer for giving the cover a uniform appearance;
   an opaque mask layer affixed to an inside-facing surface of the IR transmissive ink, the mask layer having one or more first openings substantially aligned with one or more first devices, the IR transmissive ink hiding the one or more first openings; and
   a backside hardcoat affixed to the mask layer, the backside hardcoat and the outside hardcoat having similar or identical coefficients of thermal expansion to minimize warpage of the cover.

2. The cover of claim 1, the one or more first openings of the mask layer substantially aligned with devices requiring passage of IR light and devices requiring passage of less than about 10% of visible light.

3. The cover of claim 1, the IR transmissive ink and the mask layer both having second openings substantially aligned with each other and a second device requiring maximum passage of visible light.

4. The cover of claim 3, the backside hardcoat affixed to the mask layer as a conformal coat to reduce a formation of bubbles inside a perimeter of the second openings.

5. The cover of claim 3, further comprising a computing system enclosed by the cover, the computing system comprising:
   a panel subsystem couplable to the one or more first devices or the second device;
   a panel processor coupled to the panel subsystem; and
   a host processor coupled to the panel processor.

6. The cover of claim 5, further comprising a mobile telephone that incorporates the computing system.

7. The cover of claim 6, further comprising a digital audio player that incorporates the computing system.

8. The cover of claim 1, the outside hardcoat and backside hardcoat formed from materials that act as a moisture barrier to further minimize warpage of the cover and enable full surface lamination of the cover to one of the devices below the cover.

9. The cover of claim 1, the outside hardcoat formed from a material that resists scratching and is roughened to reduce glare and produce a particular feel.

10. The cover of claim 1, the structural layer formed from polymethyl methacrylate (PMMA).

11. The cover of claim 1, the IR transmissive ink capable of passing IR light and about 5-10% of visible light, and having a first color.

12. The cover of claim 11, the mask layer capable of blocking IR and visible light and having the first color.

13. A cover for hiding one or more light-transmissive apertures for one or more devices below the cover, comprising:
    a substantially transparent structural layer;
    infrared (IR) transmissive ink affixed to an inside-facing surface of the structural layer for giving the cover a uniform appearance; and
    an opaque mask layer affixed to an inside-facing surface of the IR transmissive ink;
    wherein the mask layer includes a first opening substantially aligned with a first device requiring passage of maximum IR light and the passage of minimum visible light; and
    wherein the IR transmissive ink covers and hides the first opening.

14. The cover of claim 13, the mask layer further including a second opening substantially aligned with a second device requiring the passage of maximum visible light, the IR transmissive ink hiding the second opening.

15. The cover of claim 13, the structural layer formed from polymethyl methacrylate (PMMA).

16. The cover of claim 13, the IR transmissive ink capable of passing IR light and about 5-10% of visible light, and having a first color.

17. The cover of claim 16, the mask layer capable of blocking IR and visible light and having the first color.

18. A method for providing a cover including one or more light-transmissive apertures for one or more devices below the cover, comprising:
    affixing a substantially transparent outside hardcoat to an outside-facing surface of a substantially transparent structural layer;
    affixing an infrared (IR) transmissive ink to an inside-facing surface of the structural layer for giving the cover a uniform appearance;
    affixing an opaque mask layer to an inside-facing surface of the IR transmissive ink;
    forming one or more first openings substantially aligned with one or more first devices in the mask layer;
    hiding the one or more first openings with the IR transmissive ink; and
    affixing a backside hardcoat to the mask layer, the backside hardcoat and the outside hardcoat having similar or identical coefficients of thermal expansion to minimize warpage of the cover.

19. The method of claim 18, further comprising substantially aligning the one or more first openings of the mask layer with devices requiring passage of IR light and devices requiring passage of less than about 10% of visible light.

20. The method of claim 18, further comprising forming second openings in the IR transmissive ink and the mask layer and substantially aligning the second openings with each other and a second device requiring maximum passage of visible light.

21. The method of claim 20, further comprising conformally coating the backside hardcoat over the mask layer to reduce a formation of bubbles inside a perimeter of the second openings.

22. The method of claim 20, further comprising covering a computing system with the cover, the computing system comprising:
a panel subsystem couplable to the one or more first devices or the second device;
a panel processor coupled to the panel subsystem; and
a host processor coupled to the panel processor.

23. The method of claim 22, further comprising covering a mobile telephone that incorporates the computing system.

24. The method of claim 23, further comprising covering a digital audio player that incorporates the computing system.

25. The method of claim 18, further comprising forming the outside hardcoat and backside hardcoat from materials that act as a moisture barrier to further minimize warpage of the cover and enable full surface lamination of the cover to one of the devices below the cover.

26. The method of claim 18, further comprising forming the outside hardcoat from a material that resists scratching and is roughened to reduce glare and produce a particular feel.

27. The method of claim 18, further comprising forming the structural layer from polymethyl methacrylate (PMMA).

28. The method of claim 18, the IR transmissive ink capable of passing IR light and about 5-10% of visible light, and having a first color.

29. The method of claim 28, the mask layer capable of blocking IR and visible light and having the first color.

30. A method for hiding one or more light-transmissive apertures for one or more devices below a cover, comprising:
affixing infrared (IR) transmissive ink to an inside-facing surface of a substantially transparent structural layer for giving the cover a uniform appearance;
affixing an opaque mask layer to an inside-facing surface of the IR transmissive ink;
forming a first opening in the mask layer and substantially aligning the first opening with a first device requiring passage of maximum IR light and the passage of minimum visible light; and
hiding the first opening with the IR transmissive ink.

31. The method of claim 30, further comprising forming a second opening in the mask layer and substantially aligning the second opening with a second device requiring the passage of maximum visible light, and hiding the second opening with the IR transmissive ink.

32. The method of claim 30, further comprising forming the structural layer from polymethyl methacrylate (PMMA).

33. The method of claim 30, the IR transmissive ink capable of passing IR light and about 5-10% of visible light, and having a first color.

34. The method of claim 33, the mask layer capable of blocking IR and visible light and having the first color.

35. A mobile telephone having cover with one or more light-transmissive apertures for one or more devices below the cover, the cover comprising:
a substantially transparent structural layer;
a substantially transparent outside hardcoat affixed to an outside-facing surface of the structural layer;
infrared (IR) transmissive ink affixed to an inside-facing surface of the structural layer for giving the cover a uniform appearance;
an opaque mask layer affixed to an inside-facing surface of the IR transmissive ink, the mask layer having one or more first openings substantially aligned with one or more first devices, the IR transmissive ink hiding the one or more first openings; and
a backside hardcoat affixed to the mask layer, the backside hardcoat and the outside hardcoat having similar or identical coefficients of thermal expansion to minimize warpage of the cover.

36. A digital audio player having cover with one or more light-transmissive apertures for one or more devices below the cover, the cover comprising:
a substantially transparent structural layer;
a substantially transparent outside hardcoat affixed to an outside-facing surface of the structural layer;
infrared (IR) transmissive ink affixed to an inside-facing surface of the structural layer for giving the cover a uniform appearance;
an opaque mask layer affixed to an inside-facing surface of the IR transmissive ink, the mask layer having one or more first openings substantially aligned with one or more first devices, the IR transmissive ink hiding the one or more first openings; and
a backside hardcoat affixed to the mask layer, the backside hardcoat and the outside hardcoat having similar or identical coefficients of thermal expansion to minimize warpage of the cover.

37. A mobile telephone having a cover for hiding one or more light-transmissive apertures for one or more devices below the cover, the cover comprising:
a substantially transparent structural layer;
infrared (IR) transmissive ink affixed to an inside-facing surface of the structural layer for giving the cover a uniform appearance; and
an opaque mask layer affixed to an inside-facing surface of the IR transmissive ink;
wherein the mask layer includes a first opening substantially aligned with a first device requiring passage of maximum IR light and the passage of minimum visible light; and
wherein the IR transmissive ink covers and hides the first opening.

* * * * *